United States Patent

[11] 3,582,014

[72] Inventor Lester V. Jorgensen
Skokie, Ill.
[21] Appl. No. 780,063
[22] Filed Nov. 29, 1968
[45] Patented June 1, 1971
[73] Assignee Bell & Howell Company
Chicago, Ill.

[54] WEB CASE AND CARTRIDGE
8 Claims, 3 Drawing Figs.

[52] U.S. Cl. .......... 242/188, 242/195, 352/78
[51] Int. Cl. .......... G03b 1/02, G11b 15/22
[50] Field of Search .......... 242/188, 189, 195, 197, 198, 71.1; 352/78

[56] References Cited

UNITED STATES PATENTS

| | | | |
|---|---|---|---|
| 1,685,010 | 9/1928 | Thornton | 242/71.1 |
| 2,072,625 | 3/1937 | Rose | 242/71.1 |
| 2,095,849 | 10/1937 | Wittel | 242/71.1X |
| 3,236,428 | 2/1966 | Yamane | 242/188X |
| 3,259,331 | 7/1966 | Liddle | 242/198X |
| 3,451,636 | 6/1969 | Bunting | 242/197 |
| 3,467,341 | 9/1969 | Roman | 242/197 |

*Primary Examiner*—John Petrakes
*Attorney*—William F. Pinsak

ABSTRACT: A brake mounted in the dispensing orifice of the case is cammed by the web into nongripping association with the web to enable web rewinding into the case. Wen the camming support for the brake is broken by an opening in the leader of the web, the brake becomes biased into gripping association with the web to prevent further web rewinding.

Inventor:
Lester U. Jorgensen
By William [signature] Atty

WEB CASE AND CARTRIDGE

This invention relates to web handling. Particularly, the invention relates to means for controlling rewinding of webs, of a class including motion picture film and record tape, into a dispensing case.

Conventionally, a web such as a motion picture film or a record tape is rewindably supplied from a coil in a plastic case for repeated uses. If the web is fully wound so that its lead end is disposed in a case away from its dispensing orifice, difficulty may be encountered in the initiation of web movement. A rather stiff leader heretofore has been provided for the web with a view to facilitating initial movement by preventing web hang-up within the case. Additionally, various heretofore known expedients have been employed for preventing entry of a leader into its case. The latter means, of course, prevent problems attendant the initiation of web feed or refeed. However, the effect of such prior means is to shorten web life because of erosion or strain from interaction of the web and said means.

It is an object of the present invention to provide an improved reusable cartridge comprised of a dispensing case and a therein coiled web, such as a motion picture film or record tape.

It is another object of the invention to facilitate feeding of a web of the described class from its case following rewind.

It is a further object of the invention to prevent return of the leader or lead end section of a web of the described class to its case upon rewind.

It is an additional object of the invention to maximize life of a web rewindable in a dispensing case and having a lead end section which is prevented from entering its case.

To effect the foregoing objects, a cartridge comprises: (1) a case with an orifice and (2) a web arranged for passage through said orifice from and to a coil in a chamber defined by said case. A brake is mounted on said case for movement between a first condition in which the web is able to pass through the orifice and a second condition in which the web is prevented from moving through the orifice. A section of said web is fashioned to actuate said brake for movement to its second condition during web rewind.

Further and other objects will be apparent from the description of the accompanying drawings in which like numerals refer to like parts.

Figures 1, 2, 3:
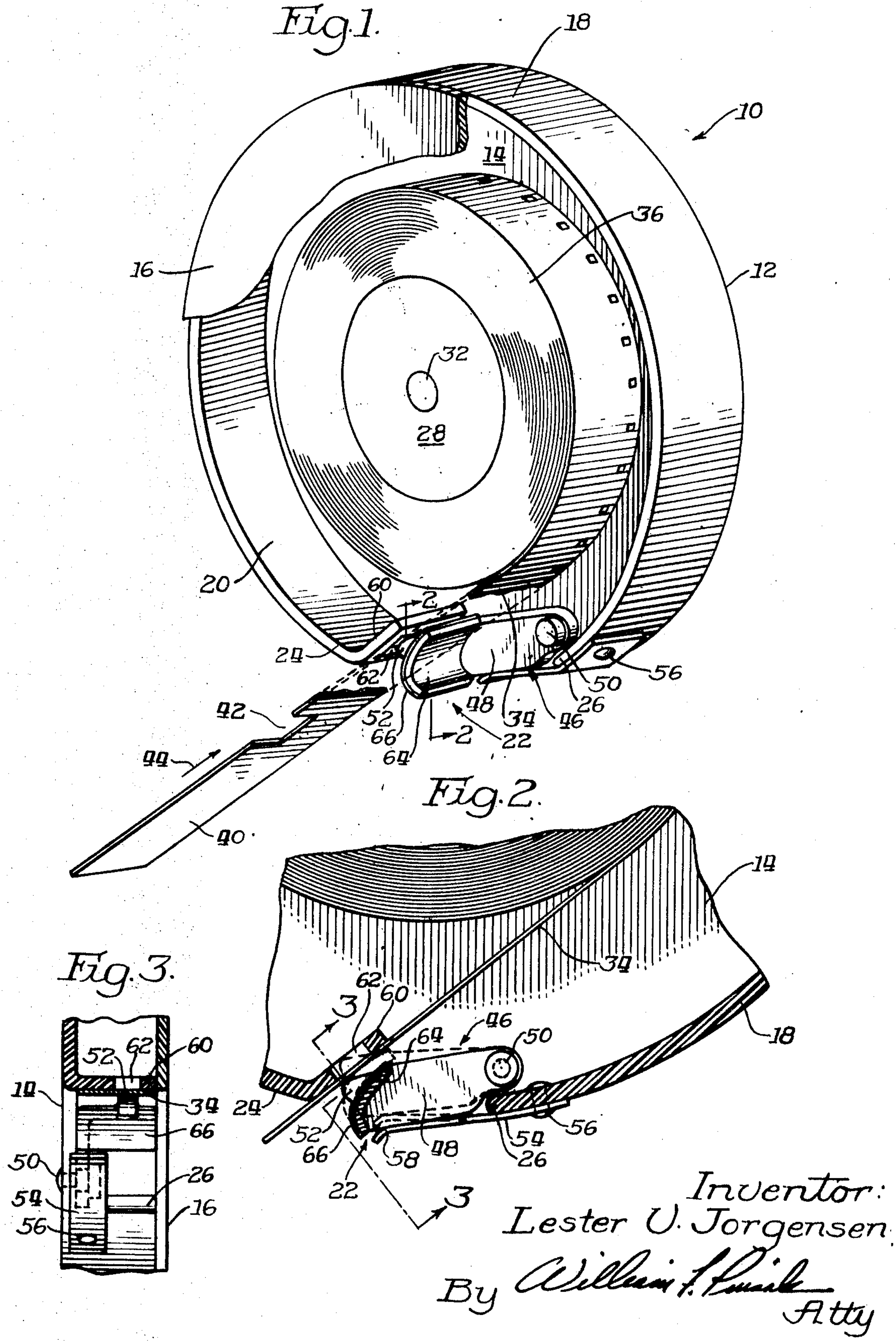
FIG. 1 is a perspective view of a cartridge embodying the present invention, a wall of the cartridge case being shown partially broken away.
FIG. 2 is a detailed view according to the broken section line 2–2 of FIG. 1 and showing a brake of the embodiment in side elevation.

FIG. 3 is a view of said brake according to the broken section line 3–3 of FIG. 2. Referring now more particularly to the drawings, the invention is embodied in a cartridge generally designated 10 and comprised of dispensing case 12 which may be of rigid plastic fabrication, and web 34. The case defines reel chamber 20 and comprises circular sidewall 14, a thereto parallel cover defining circular sidewall 16, and perimetric arcuate wall 18 disposed between and connected to said sidewalls. Access to chamber 20 is through orifice 22 (FIG. 2) formed between spaced apart end portions 24 and 26 of wall 18.

A spool or cylindrical core 28 which may be of conventional construction is rotationally mounted in chamber 20 concentrically with wall 18. To enable its rotation, core 28 has an axial hole 32 adapted for journaling accommodation of suitable axle means (not shown) which may be hung from or supported by case 12.

Web 34, which may be a motion picture film (as herein shown) or a record tape, is arranged in coil 26 on core 28 to which the trail end section (not shown) of the web may be suitably anchored by conventional means. Its lead end section or leader 40 preferably is fabricated from a material having greater rigidity and "body" than the remainder of the web and is fashioned or formed with a notch or opening 42 for a purpose of which will become hereinafter apparent.

Orifice 22 provides means for passing the web from and to coil 36 during web feed and rewind. To prevent rewinding of leader 40 in the direction of arrow 44 into case 12, from which manual removal might prove quite difficult, a brake generally designated 46 is provided in accordance with the invention. Said brake is mounted on the case by means which will become hereinafter apparent for movement between a first condition (solid line in FIG. 2) in which web 34 is able to pass through orifice 22, and a second condition (dashed in FIG. 2) in which the web is prevented from moving through said orifice. As will be apparent from the ensuing description, leader 40 is fashioned so to actuate movement of said brake from its first to its second condition and from its second condition to its first condition.

To effect web control in the exemplary embodiment, brake 46 comprises gate or body 48 which is rockably arranged parallel to wall 14 in orifice 22. Pivot 50 which extends normal to said wall, effects gate mounting and thereby enables brake movement between its first and second conditions.

Means for holding brake 46 in its first condition comprises follower 52 which in its preferred embodiment is fashioned integrally with gate 48 and is proportioned for bearing engagement with a brake supportive on camming surface of web 34. Camming association of the brake and web is effected through the agency of biasing means comprising leaf spring 54. The latter has one end portion connected by a suitable fastener, such as rivet 56, to end portion 26 of wall 18, and an opposite end portion 58 which extends into orifice 22 into association with gate 48 for urging brake 46 toward its second condition. However, while the brake is web supported, it is prevented from moving to its second condition.

The tension of spring 54 is sufficient to cause follower 52 to urge any portion of the web passing through orifice 22 into engagement with backup plate 60. The latter member is shown as being integrally formed with wall 18 and projects into case 12 from wall end portion 24. For a purpose which will become apparent hereinafter, the backup plate has an aperture or opening 62 which is proportioned for reception of follower 52.

Brake shoe 64, having a frictional cover comprising braking surface 66, which may be fabricated from rubber or the like, is carried by brake 46 and extends normally from gate 48 parallel to a proximate web surface when in orifice 22. Brake shoe 64 is substantially as wide as web 34 and is disposed medially of follower 52 and pivot 50. The parts are proportioned so that while the brake is disposed in its first condition, the braking surface 66 is disengaged from the web.

Notch 42, heretofore described, provides a break or interruption in the brake supportive surface of the web, said notch being proportioned and arranged for reception of follower 52 when leader 40 is disposed against backup plate 60. Accordingly, when the web is being wound or rewound, normal biasing of spring 58 will cause the follower to drop into said notch. The disposition of aperture 62 is such that it will be "-seen" by follower 52 through notch 42; and said aperture is proportioned for reception of said follower. Accordingly, said aperture will be penetrated or entered by the follower under the biasing of said spring when the follower drops through said notch. The parts are proportioned in a manner such that as the follower drops into aperture 62, braking surface 66 will move into engagement with the thereto proximate surface of leader 40.

The angular inclinations of backup plate 60 and brake shoe 64 are such that as brake 46 moves from its first to its second condition, the brake shoe moves toward backup plate 60. In consequence of the foregoing, once surface 66 engages the leader the brake will be drawn by the rewind torque inwardly to wedge the leader between the backup plate 60 and brake shoe 64. It is appreciated that the proportioning of parts is such that the brake shoe cannot be swung into the case 12 beyond the backup plate. Thereby, the braking force of surface 66 rather than the latching effect of follower 52 is essentially effective in stopping web movement upon rewind. Such arrangement prevents erosion of the leader through damage to the sides of notch 42, and prevents damage to the follower and the sides of aperture 62. To facilitate feeding of the web from its case following rewind, leader 40 is pulled outward from the case 12 causing one side of the notch 42 to engage the follower 52 and move the brake 46 from the web braking second condition to the free web movement first condition.

I claim:

1. In a case of the type used for a coiled web of motion picture film or record tape and having an orifice for reversibly passing a web, the improvement comprising:

a brake mounted for movement at said orifice between a first condition in which said orifice is open for passing a web and a second condition in which said orifice is relatively closed for preventing web movement;

a follower arranged for supportive engagement by a surface of a web in said orifice to hold said brake in said first condition and aligned for engagement in a notch in a leader of a web in said orifice;

means for biasing said follower into said notch to move said brake to said second condition; and said follower being operable by the web to move said brake from said second condition to said first condition when moving the web from the case.

2. A combination according to claim 1, further characterized by a backup plate integral with said case and disposed adjacent said orifice for impinging a web from opposite surfaces when said brake is in said second condition.

3. A combination according to claim 2 in which said follower is carried by said brake.

4. A combination according to claim 3 in which said backup plate has an aperture proportioned for reception of, and in receiving alignment with, said follower to enable said brake to move to its second condition and impinge a web in said orifice.

5. A combination according to claim 4, characterized by a shoe carried from said brake for frictionally engaging against a surface of a web to hold the other surface thereof against said backup plate when said brake is in said second condition.

6. A combination according to claim 5 in which said case defines a chamber and comprises a pair of parallel sidewalls and a perimetric wall disposed between said sidewalls, said perimetric wall having opposed end portions defining said orifice; and a pivot for connecting said brake to one of said sidewalls, said backup plate extending from one of said end portions into said chamber and arranged for limiting movement of said brake in said orifice.

7. A combination according to claim 6 in which said biasing means comprises a spring secured adjacent the other of said end portions and bearing against said brake for urging said shoe toward said backup plate.

8. In a cartridge having a case defining a chamber with an orifice and a web arranged for passage through the orifice from and into the chamber, the improvement comprising:

a brake mounted on the case for movement between a first condition in which the web is able to pass through the orifice and a second condition in which the web is prevented from moving into the chamber through the orifice;

means biasing said brake toward said second condition; and the web having an opening to permit said biasing means to move said brake to said second condition to block film movement into the chamber and having a surface for moving said brake from said second condition to said first condition when the film is moved from the chamber to permit film movement through the orifice.